United States Patent [19]

Schwarz

[11] 4,223,059
[45] Sep. 16, 1980

[54] PROCESS AND PRODUCT THEREOF FOR STRETCHING A NON-WOVEN WEB OF AN ORIENTABLE POLYMERIC FIBER

[75] Inventor: Eckhard C. A. Schwarz, Neenah, Wis.

[73] Assignee: Biax Fiberfilm Corporation, Neenah, Wis.

[21] Appl. No.: 900,720

[22] Filed: Apr. 27, 1978

Related U.S. Application Data

[63] Continuation of Ser. No. 563,623, Mar. 31, 1975, abandoned.

[51] Int. Cl.² ............... B29C 17/02; D04H 3/12; D06C 3/06
[52] U.S. Cl. .................................. 428/198; 264/286; 264/287; 264/288.8; 428/288
[58] Field of Search ............... 264/287, 289, DIG. 47, 264/DIG. 73, 288, 286; 428/910, 296, 198, 288

[56] References Cited

U.S. PATENT DOCUMENTS

| 2,697,678 | 12/1954 | Ness et al. | 428/288 |
|---|---|---|---|
| 3,305,911 | 2/1967 | Chapman et al. | 264/289 |
| 3,574,809 | 4/1971 | Fairbanks et al. | 264/289 |
| 3,849,526 | 11/1974 | Muller et al. | 264/289 |
| 3,949,127 | 4/1976 | Ostermeier et al. | 428/910 |
| 3,991,250 | 11/1976 | Hartman et al. | 428/910 |
| 4,048,364 | 9/1977 | Harding et al. | 428/910 |

Primary Examiner—James B. Lowe
Attorney, Agent, or Firm—Louis E. Marn; Elliot M. Olstein

[57] ABSTRACT

A non-woven web of synthetic fibers is selectively stretched in incremental portions in a first and second station wherein the first and second station are provided with sets of rolls having grooves parallel and perpendicular, respectively, to the axis of each set of rolls to form a bi-axially stretched web. One groove pattern of the rolls is generally a sinosoidal wave with distances between grooves being less than 1.0 millimeters times the web basis weight in grams per square meter.

12 Claims, 5 Drawing Figures $$\text{DRAW RATIO} = \frac{l}{W} = \frac{1}{\pi}\int_0^\pi \sqrt{1+a^2\cos^2 x}\ dx$$

$$a = \frac{\pi d}{W}$$

PROCESS AND PRODUCT THEREOF FOR STRETCHING A NON-WOVEN WEB OF AN ORIENTABLE POLYMERIC FIBER

This is a continuation, application Ser. No. 563,623, filed Mar. 31. 1975, now abandoned.

This invention relates to a novel process and apparatus for the stretching of non-woven and spun-bonded webs of synthetic fibers to improve the strength thereof and more particularly to a novel process and apparatus for the bi-axial stretching incremental portions of non-woven webs of orientable, polymeric fibers.

BACKGROUND OF THE INVENTION

Many non-woven and (continuous filament) spun-bonded fabrics or webs have found use in the market as substitutes for textile materials. Such webs consist of randomly laid fibers, either in the form of short staple lengths or continuous filaments, which are undrawn or only partially drawn, and have therefore not obtained their optimum strength. Conventional methods of web stretching, such as Godet-roll stretching and lateral stretching in tenter-frames, do not lend themselves to stretching of such webs. In longitudinal roll stretching a narrowing of the web occurs, the individual fibers between bonding points do not undergo molecular orientation. In lateral tenter-frame stretching, tearing at the clamps frequently destroys the web. In the case of non-woven webs made from short length staple fibers, individual fibers become separated because the stretching tension exceeds the bonding strength of the bonded cross-over points of the fibers.

OBJECTS OF THE INVENTION

It is an object of the present invention to provide a novel process and apparatus for stretching incremental portions of a non-woven web of synthetic material.

Another object of the present invention is to provide a novel process and apparatus for bi-axially stretching incremental portions of a non-woven web of synthetic material to substantially improve optimum strength.

Various other objects and advantages of the present invention will become apparent from the following detailed description of an exemplary embodiment thereof with the novel features thereof being particularly pointed out in the appended claims.

SUMMARY OF THE INVENTION

In accordance with the present invention, there is provided a process and apparatus for selective stretching a non-woven web of synthetic fibers in a station provided with a set of grooved rolls. The groove pattern of the rolls is generally a sinosoidal wave having a distance between grooves of less than 1.0 millimeters times the web basis weight in grams per square meter. Accordingly, the web of synthetic material is stretched in a manner to affect uniform stretching incremental portions between the bonding points of each individual fiber thereby producing a web of larger dimension in the direction of stretch.

In accordance with a preferred embodiment of the present invention, there is provided a process and apparatus for bi-axially stretching such a web of synthetic fiber in a first and second station wherein the first and second stations are provided with sets of rolls having grooves parallel and perpendicular, respectively, to the axis of each set of rolls. The groove pattern of each set of rolls is such that the distance between grooves is less than 1.0 millimeters times the web basis weight in grams per square meter. The non-woven web of synthetic material is stretched in a manner to affect uniform stretching between bonding points of each individual fiber thereby producing a web of bi-axially larger dimension and correspondingly reduced base weight.

BRIEF DESCRIPTION OF THE DRAWINGS

The invention will be more clearly understood by reference to the following detailed description of an exemplary embodiment thereof in conjunction with the accompanying drawings wherein.

DETAILED DESCRIPTION OF THE INVENTION

Drive and support assemblies, timing and safety circuits and the like known and used by those skilled in the art have been omitted in the interest of clarity.

Figure 1:
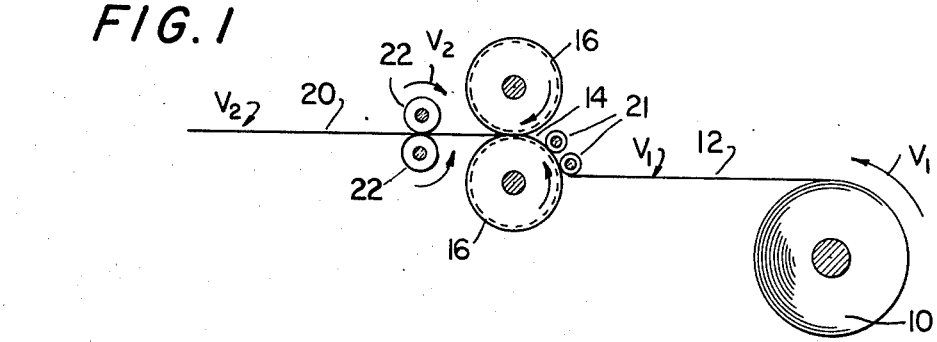
FIG. 1 is a schematic side elevational view of the first station of the apparatus and process of the present invention.
Figure 2:
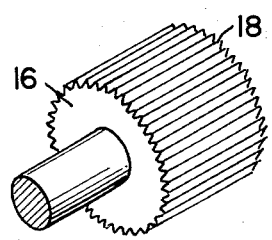
FIG. 2 is an isometric view of one of the rollers of the first station.
Figure 3:
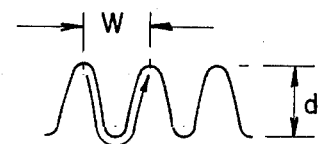
FIG. 3 graphically illustrates a sinosoidal curve.

Referring to FIG. 1 illustrating the first station of the process and apparatus of the present invention, there is provided a supply roll 10 on which is mounted a non-woven web 12 of orientable polymeric fibers (continuous or discontinuous). The web 12 is coursed between a nip 14 of a pair of rollers 16 having a plurality of grooves 18 parallel to the axis of the rollers 16, as seen in FIG. 2. The web 12 is maintained against the lower grooved roller 14 by a pair of press rollers 21 to ensure that the velocity ($V_1$) of the web 12 is substantially identical to the surface velocity ($V_1$) of the grooved rollers 16. The grooves 18 of the rollers 16 are intermeshed like gears, as known to those skilled in the art. As the web 12 enters the nip 14, the web 12 assumes the shape of a groove 18 and is stretched by a factor determined by the length of the sinus wave "l" (See FIG. 3) of the groove divided by the original length of the web "W" between contact points of each respective groove tip, since the web is prevented from slipping by the press rollers 21 to prevent the introduction of more material, as is more commonly practiced in the corrugating art.

The draw ratio l/w is calculated by the following equation where $a = \pi d/2W$, and the sinus wave of the groove is $$l/w = \int_0^\pi \sqrt{1 + a^2\cos^2 x} \, dx \div \pi$$

Thus for d/w ratios of 1.0, 0.45 and 0.5 the draw ratios are 2.35, 2.0 and 1.6, respectively.

The web 12 after passage through the nip 14 of the rollers 16 is pulled away by a pair of tension rollers 22 having a surface velocity ($V_2$) greater than the surface velocity of the rollers 16, but not greater than a factor of the draw ratio affected in the nip 14 of the rollers 16.

In accordance with the present invention, the length of the fabric is therefore increased by this factor. It is noted that the web does not undergo narrowing while being longitudinally stretched or extended, as is the case with conventional roller systems. It is apparent to one skilled in the art that the web may sequentially pass through a plurality of pairs of grooved rollers 16 to further stretch lengthwise the web 12.

If stretching is permitted to be carried out beyond the residual elongation of the individual fibers, the fibers will break and the web loose tensile strength. Strength per fabric basis weight is increased considerably up to the point of breaking fibers. The maximum permissible draw ratio can easily be determined by measuring the residual elongation of the individual fibers of the original web. For best results, the grooves 18 of the rollers 16 should be as fine as possible, with groove distance being increased, if heavy basis weight factors are to be oriented. From experience, good results are obtained, if the distance between grooves (in mm) is less than 1.0 times the fabric basis weight (in gram/m$^2$). The larger the groove distance, the more fiber cross-over points are being separated or broken thereby weakening the fabric structure. In the case of non-woven webs made from short staple fibers, groove distance (d) should be one-half of the fiber length or less. If the groove distance (d) is larger, fibers are separated out by breaking rather than stretched between the grooves, and the web thereby becomes very weak.

Figure 4:
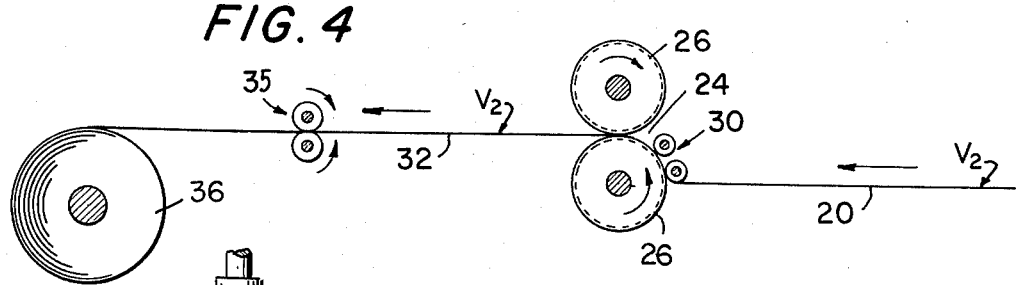
FIG. 4 is a schematic side elevational view of the second station.
Figure 5:
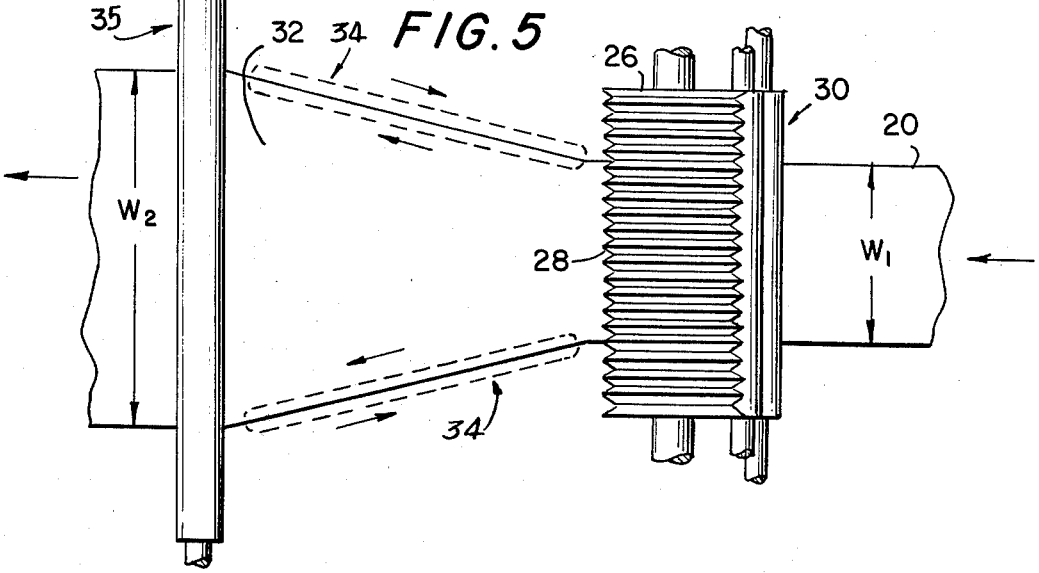
FIG. 5 is a top view of the second station.

Referring now to FIG. 4, the longitudinally stretched web 20 from the first station including press rollers 21 is introduced into a nip 24 formed by a pair of rollers 26 having a plurality of grooves 28 parallel to the circumference of the rollers 26 in a second station of the apparatus. The web 20 is caused to be coursed into the nip 24 by a pair of press rollers 30 which holds the web 20 against the lower roller 26 to thereby prevent the web 20 from narrowing prior to introduction. Once in the nip 24, the web 20 assumes the shape of the groove pattern and becomes stretched by a factor of the draw ratio determined in a manner similar to the draw ratio discussed with reference to FIG. 1. In the second station, ie., lateral stretching, the web 32 is wound up at about the same velocity as the feed velocity. The crimp pattern is flattened out by stretching the web 32 laterally by means of tenter clamps or curved Mount Hope rolls, generally indicated as 34 by the dotted lines and arrows such as known and used by one skilled in the art, with the product being collected on a roller 36 via roller set 35. For best results, the longitudinal and lateral stretching steps are repeated alternately through multiple passes each having a relatively low draw ratio, until the total permissible draw ratio is reached. The number of longitudinal and lateral passes, as well as the extent of the stepwise draw ratios, can be chosen so that a final fabric is obtained with uniform properties balanced in both directions.

With the process and apparatus of the present invention, non-woven and spun-bonded webs and fabrics can be produced having a much higher tensile tear strength (expressed as grams per centimeter) and tensile tear length (expressed as meters) per basis weight than unstretched fabrics. The fabric basis weight is decreased during the stretching process by a factor of the area draw ratio (=longitudinal draw ratio×lateral draw ratio). The denier of the individual fibers is reduced similarly, resulting in a web of still bonded but finer fibers. Fabrics processed by the present invention are softer and drapier than the original material and result in completely new types of products.

Examples of the Invention

Operation of the process and apparatus is described in the following examples which are intended to be merely illustrative and the invention is not to be regarded as limited thereto.

EXAMPLE I

A randomly laid web of partially oriented polypropylene fibers (cross-over points of the filaments being most fused during melt blowing step of web formation) produced by a process similar to that described in U.S. Pat. No. 3,849,241 having the following properties is processed in accordance with the present invention:

| Basis weight | 100 gm/m$^2$ |
| --- | --- |
| Filament denier | 1–5 |
| Tear strength (tensile) | 785 gm/cm.(linear) |
| Tensile tear length | 785 meters |

The web is introduced into rollers 16 having a surface velocity of 3.05 meters per minute. Each groove is formed with a depth (d) of 3 mm and with a spacing (w) of 4 mm thereby resulting in a draw ratio of 2.0. The web 20 is pulled from the nip 14 by tension rollers 22 having a surface velocity of 6.10 m. per minute. The web is subsequently passed through similar longitudinal and lateral stretch stations until a total draw ratio of 16.0 is reached at which point the web exhibited the following properties:

| Basis weight | 6.2 gm/m$^2$ |
| --- | --- |
| Filament denier | 0.1–1 |
| Tear strength (tensile) | 98.4 gm/cm (linear) |
| Tensile tear length | 1587 meters |

The tensile tear length per basis weight (expressed as meters) of the product is 1587 as compared with that of 785 of the starting polypropylene fibrous material.

EXAMPLE II

A commercially available spun-bonded web of continuous polyester fiber having the following properties is processed in grooved rollers having a depth of 2.5 mm and a width of 5.0 mm (draw ratio is 1.6):

| Basis weight | 63 gm/m$^2$ |
| --- | --- |
| Filament denier | 15 |
| Tear strength (tensile) | 1102 gm/cm (linear) |
| Filament elongation | 250% |

The web is introduced into the rollers 16 at a surface velocity of 3.05 meters per minute and is withdrawn by tension rollers 22 at a velocity of 4.88 meters per minute. After passage through two complete stretchings operations (both including longitudinal and lateral stations), the web exhibited the following properties:

| Basis weight | 25 gm/m$^2$ |
| --- | --- |
| Filament denier | 6 |
| Tear strength (tensile) | 787.4 gm/cm |

Tensile tear length (meter) of the product is 3149.6 meters as compared to 1749.2 of the starting polyester material.

EXAMPLE III

A latex bonded randomly laid non-woven web consisting of 1.27 cm polyester staple fibers having the following properties is processed in accordance with the present invention:

| | |
|---|---|
| Basis weight | 32 gm/m² |
| Filament denier | 7 |
| Tear strength (tensile) | 157.5 gm/cm (linear) |

The respective rollers were formed with grooves having a depth of 1 mm and a width of 3 mm (draw ratio 1.8). The web after bi-axially stretching followed by pressing between calendar rolls exhibited the following properties:

| | |
|---|---|
| Basis weight | 18 gm/m² |
| Filament denier | 4.0 |
| Tear strength | 177.2 gm/cm (linear) |

The tensile tear length (meter) of the product is 984.4 as compared with 492.2 of the starting material.

While the present invention has been described with reference to the passage of a web through a first longitudinal stretching station and thence a lateral stretching station, it is apparent that such stations may be altered with the web being first introduced into a lateral stretching station. Further, the apparatus and process of the present invention may be arranged to provide for longitudinal stretching to the limit of the material capabilities prior to lateral stretching. Additionally, it is contemplated that in some instances that it is desireable to stretch the material solely in either a longitudinal or lateral direction.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed is:

1. A process for longitudinally stretching incremental portions of a non-woven web of thermoplastic orientable polymeric fibers to thereby improve the strength of the web which comprises:
   (a) introducing said web into a nip of interdigitating rollers having grooves substantially parallel to the axis of said rollers, the distance between grooves being less than one millimeter times the web basis weight in grams per square meter;
   (b) controlling the velocity of introduction of said web into said nip to assume and maintain the velocity substantially identical to the surface velocity of said rollers to prevent slipping of said web and thereby longitudinally and uniformly stretch said web between bonding points of each individual fiber by a deflection of said web into the shape of said grooves; and
   (c) collecting the thus stretched web.

2. The product produced by the process of claim 1.

3. The process as defined in claim 1 wherein the withdrawal velocity is not greater than a factor of the draw ratio of said nip of interdigitating rollers.

4. The process as defined in claim 1 wherein the steps (a) to (f) are repeated prior to step (g).

5. A process as defined in claim 1 wherein said stretched web is withdrawn from said interdigitating rollers at a velocity greater than the surface velocity of said rollers to pull said web away from said interdigitating rollers.

6. A process as defined in claim 1 wherein steps (a) and (b) are repeated prior to step (c).

7. The process for laterally stretching incremental portions of a non-woven web of thermoplastic orientable polymeric fibers to thereby improve the strength of the web which comprises:
   (a) introducing said web into a nip of interdigitating rollers having grooves substantially perpendicular to the axis of said rollers, the distance between grooves being less than one millimeter times the web basis weight in grams per square meter;
   (b) controlling the velocity of introduction of said web into the said nip to assume and maintain the velocity substantially identical to the surface velocity of said rollers to prevent narrowing of said web prior to introduction into said nip and thereby to laterally and uniformly stretch said web between bonding points of each individual fiber by a deflection of said web into the shape of said grooves;
   (c) withdrawing said web from said rollers at a velocity substantially corresponding to the velocity of introduction; and
   (d) collecting the thus stretched web.

8. The product produced by the process of claim 7.

9. A process as defined in claim 7 wherein said stretched web is laterally extended prior to step (c).

10. A process for biaxially stretching a non-woven web of thermoplastic orientable polymeric fibers to thereby improve the strength of the web which comprises:
    (a) introducing said web into a nip of interdigitating rollers having grooves substantially parallel to the axis of said rollers, the distance between grooves being less than one millimeter times the web basis weight in grams per square meter;
    (b) controlling the velocity of introduction of said web into said nip to assume and maintain the velocity substantially identical to the surface velocity of said rollers to prevent slipping of said web and thereby longitudinally and uniformly stretch said web between bonding points of each individual fiber by a deflection of said web into the shape of said grooves;
    (c) withdrawing said web from said rollers at a velocity greater than the rotational velocity of said rollers;
    (d) introducing said web into a nip of interdigitating rollers having grooves substantially perpendicular to the axis of said rollers, the distance between grooves being less than one millimeter times the web basis weight in grams per square meter;
    (e) controlling the velocity of introduction of said web into the said nip to assume and maintain the velocity substantially identical to the surface velocity of said rollers to prevent narrowing of said web prior to introduction into said nip and thereby to laterally and uniformly stretch said web between bonding points of each individual fiber by a deflection of said web into the shape of said grooves;
    (f) withdrawing said web from said rollers at a velocity substantially corresponding to the velocity of introduction; and
    (g) collecting a biaxially stretched web.

11. The product produced by the process of claim 10.

12. The process as defined in claim 10 wherein steps (d) to (f) are effected prior to steps (a) to (c).

* * * * *